United States Patent
Dunlap

(10) Patent No.: US 9,206,839 B2
(45) Date of Patent: Dec. 8, 2015

(54) SLOTTED BUSHING FOR TRANSFERRING LUBRICATION

(71) Applicant: Allison Transmission, Inc., Indianapolis, IN (US)

(72) Inventor: Robert Keith Dunlap, Greenwood, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 14/085,918

(22) Filed: Nov. 21, 2013

(65) Prior Publication Data

US 2014/0147068 A1    May 29, 2014

Related U.S. Application Data

(60) Provisional application No. 61/731,065, filed on Nov. 29, 2012.

(51) Int. Cl.
  *F16C 33/10*   (2006.01)
  *F16C 17/02*   (2006.01)

(52) U.S. Cl.
  CPC ............. *F16C 17/02* (2013.01); *F16C 33/1055* (2013.01); *F16C 33/1065* (2013.01); *Y10T 29/49668* (2015.01)

(58) Field of Classification Search
  CPC .. F16C 17/02; F16C 33/1045; F16C 33/1055; F16C 33/106; F16C 33/1065; F16C 33/109; F16C 32/0629; F16C 32/0633; F16C 32/064; F16C 32/0651; F16C 32/0655; F16C 32/0659; Y10T 29/49668
  USPC .......................... 384/286–293, 322, 397, 475; 29/898.054, 898.056
  See application file for complete search history.

(56) References Cited

U.S. PATENT DOCUMENTS

| | | | | |
|---|---|---|---|---|
| 3,343,893 A | * | 9/1967 | Hall | 384/291 |
| 5,921,349 A | * | 7/1999 | Sato et al. | 384/322 |
| 6,272,751 B1 | * | 8/2001 | McMeekin | 29/898.054 |
| 6,491,438 B1 | * | 12/2002 | Ono et al. | 384/288 |
| 2003/0179966 A1 | * | 9/2003 | Hojo et al. | 384/288 |
| 2009/0304315 A1 | * | 12/2009 | Johnson | 384/295 |
| 2012/0246867 A1 | * | 10/2012 | Ziegler et al. | 16/2.1 |
| 2012/0294558 A1 | * | 11/2012 | Ovares et al. | 384/288 |

* cited by examiner

*Primary Examiner* — James Pilkington

(74) *Attorney, Agent, or Firm* — Stephen F. Rost, Esq.; Taft Stettinius & Hollister LLP

(57) ABSTRACT

A bushing for promoting fluid transfer between a first body and a second body. The bushing includes a cylindrical sleeve including an inner surface and an outer surface. A groove is formed in the inner surface and defined by a first wall and a second wall. A plurality of openings is defined in the groove, such that the plurality of openings is radially spaced from one another.

20 Claims, 5 Drawing Sheets

SLOTTED BUSHING FOR TRANSFERRING LUBRICATION

CROSS-REFERENCE TO RELATED APPLICATIONS

This application claims priority to U.S. Provisional Patent Application Ser. No. 61/731,065, filed Nov. 29, 2012, which is hereby incorporated by reference in its entirety.

FIELD OF THE DISCLOSURE

The present disclosure relates to a bushing, and in particular to a bushing that can transfer fluid without requiring an external annulus groove or an indexed position.

BACKGROUND

Bushings are commonly used to create a low-friction surface between a carrier member and a kinetic member. A bushing allows the two members to move or rotate easily with regards to one another. In many assemblies fluid must transfer through the bushing between the kinetic member and the carrier member to ensure proper circulation. Further, the addition of a fluid can lubricate the bushing, promoting low friction and heat levels between the bushing and the kinetic member.

One common method of transferring fluid between the carrier member and the kinetic member involves creating through-holes in the bushing. These through-holes in turn allow fluid to transfer between the carrier member and the kinetic member.

SUMMARY

In one embodiment of the present disclosure, a bushing is provided for promoting fluid transfer between a first body and a second body. The bushing includes a cylindrical sleeve including an inner surface and an outer surface; a groove formed in the inner surface, the groove defined by a first wall and a second wall; and a plurality of openings defined in the groove; wherein, the plurality of openings is radially spaced from one another.

In one example, the groove is defined annularly about the inner surface of the sleeve. In a second example, the plurality of openings comprises an oval or rectangular shape. In a third example, the inner surface comprises a friction-reducing coating or layer of material. In a fourth example, the plurality of openings are equally spaced from one another and are configured to be fluid coupled with at least one fluid passageway in the first body or the second body. In a fifth example, the first wall and the second wall are structured to substantially maintain a fluid within the groove.

In another embodiment, a transmission is provided for a motor vehicle. The transmission includes a shaft including a fluid directing channel defined therein; a carrier member including at least one fluid passageway for promoting fluid flow, wherein the fluid passageway of the carrier member is located along a bushing coupling surface; and a bushing disposed at least partially between the shaft and the carrier member, the bushing comprising: a cylindrical body having an inner face, an outer face, a first edge, and a second edge; a depression formed in the inner face of the bushing between the first edge and the second edge; and a plurality of through holes defined in the depression and spaced radially from one another, the plurality of through holes defining a fluid path between the inner surface and the outer surface of the cylindrical body; wherein, the fluid directing channel of the shaft, the depression, the plurality of through holes, and the fluid passageway of the carrier member are fluidly coupled to one another.

In one example of this embodiment, the depression is substantially centered between the first edge and the second edge. In a second example, the plurality of through holes comprises an oval or rectangular shape; and the depression is annularly shaped. In a third example, a first wall and a second wall that define a width of the depression; wherein, the first wall and the second wall substantially maintain a fluid in the depression along the inner face of the shaft. In a fourth example, only one of the plurality of through holes is fluidly coupled to the fluid directing channel and the fluid passageway. In a fifth example, the plurality of through holes are substantially centered between the first edge and the second edge. In a sixth example, each through hole comprises a length and a width, where the length is at least three times the width. In a seventh example, at least one of the plurality of through holes defined in the depression is not fluidly coupled to the fluid directing channel or the at least one fluid passageway. In an eighth example, the plurality of through holes is equally spaced from one another in the depression.

In a different embodiment of the present disclosure, a method is provided for manufacturing and installing a bushing that allows for fluid transfer between a carrier member with a fluid transfer passage and a kinetic member with fluid transfer passage. The method includes cutting a piece of material to a desired length; forming an annulus groove along the length of the piece of material; forming a plurality of through holes in the annulus groove; bending the material to create a substantially cylindrical bushing; pressing the bushing into the carrier member; and inserting the kinetic member therein.

In one example of this embodiment, the method includes forming the through holes to be equally spaced from one another. In a second example, forming a fluid passage in the kinetic member such that after the inserting step the fluid passage is fluidly coupled with at least one of the plurality of through holes. In a third example, the method includes fabricating an orifice in the carrier member such that after the pressing step the orifice is fluidly coupled with at least one of the plurality of through holes. In a fourth example, the method includes bending the material and positioning the depression on an interior surface of the bushing.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
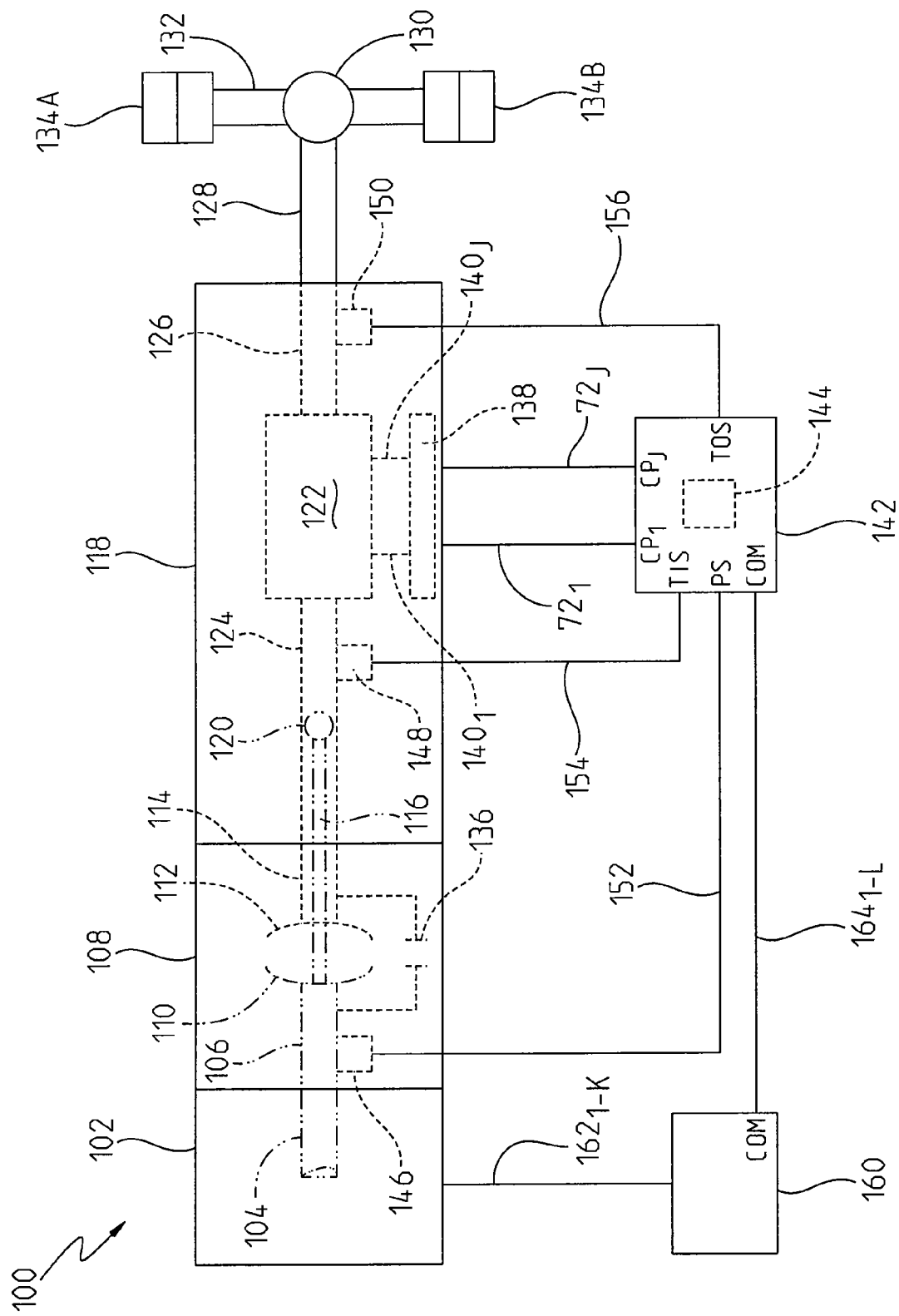
FIG. 1 is a block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the turbine shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150. The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, 1-K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, 1-L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols.

As previously described, the drive unit 102 drives the internal pump 120 of the transmission 118. During operation, oil inside the transmission can be supplied by the internal pump 120 to a main oil circuit, the torque converter 108, a cooler, and an internal lube circuit. The internal pump 120, however, requires the drive unit 102 to be operating, and if the drive unit 102 is not operating, oil cannot be supplied to the main oil circuit, torque converter 108, cooler, or lube circuit. Without oil passing through the lube circuit, the connection between the transmission output shaft 126 and rear axle 132 must be disassembled if the vehicle 100 is towed. Otherwise, one or more components internal to the transmission 118 can be damaged due to a lack of lubrication.

There are some conventional designs or methods developed to ensure the proper transfer of fluid through a bushing to provide sufficient lubrication or operation of a hydraulic system. In one example, the bushing is indexed against a planetary carrier assembly to ensure proper fluid passageway alignment. The carrier assembly has a fluid passage (i.e. an orifice, grove, or other means) through which fluid flows to or from the bushing. If through-holes in the bushing do not align with the fluid transfer passage in the carrier assembly, the lubricating fluid will not be transferred effectively to the kinetic member. To achieve this conventional arrangement, the bushing requires proper indexing with the carrier assembly during installation. This is achieved by machining the bushing and carrier assembly. During installation, proper alignment is ensured because the bushing will only fit if correctly indexed against the carrier assembly. Indexing can be achieved without special machining, but does require careful installation of the bushing. Indexing the bushing requires either detailed machining and/or careful installation of the bushing which can be difficult and expensive to achieve. Further, incorrect indexing of the bushing during installation can cause failure of the part due to overheating and lack of lubrication.

A further conventional example requires drilling fluid passageways in the carrier member and the bushing simultaneously. The bushing is fit into the carrier member and fluid passageways are drilled through both the carrier member and the bushing simultaneously. This method reduces the need for indexing but has several flaws. One issue is that it requires drilling (i.e., a machining process) after the bushing has been installed in the carrier member (i.e., an assembly process). This is undesirable because it requires bushing through-holes to be drilled any time a new bushing is installed. This process requires access to costly special tools during replacement or installation. Further, the bushing may become misaligned during operation, restricting any fluid circulation at the bushing.

In another conventional example, an annulus groove in the carrier member is used to ensure proper fluid transfer between the bushing and the carrier member. The annulus groove is designed to allow the bushing to be disposed in the carrier member without requiring indexing. The annulus groove creates a small channel in the carrier member that is enclosed by the bushing. This channel allows fluid to transfer along the outer bushing surface. Further, any through-holes that are located along the bushing allow fluid to transfer about the kinetic member. This method, however, requires costly machining of an annulus groove and decrease the structural integrity of the carrier member.

Thus a need exists for a bushing that allows fluid to be distributed appropriately from a carrier member to a kinetic member without requiring expensive machining and/or careful indexing during installation.

Figure 2:
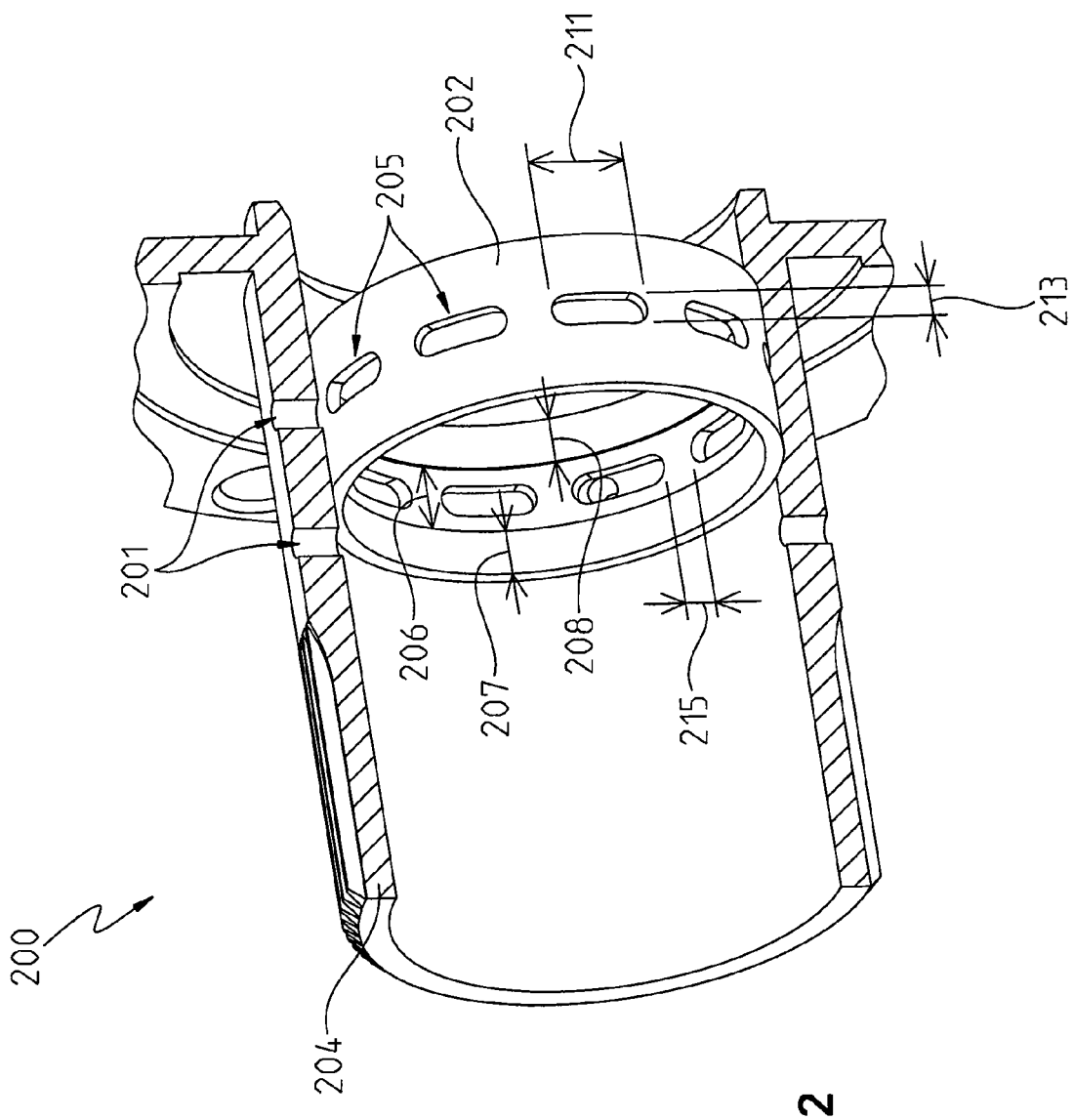
FIG. 2 is a partial cross-sectional view of a bushing disposed in a carrier member.
Figure 5:
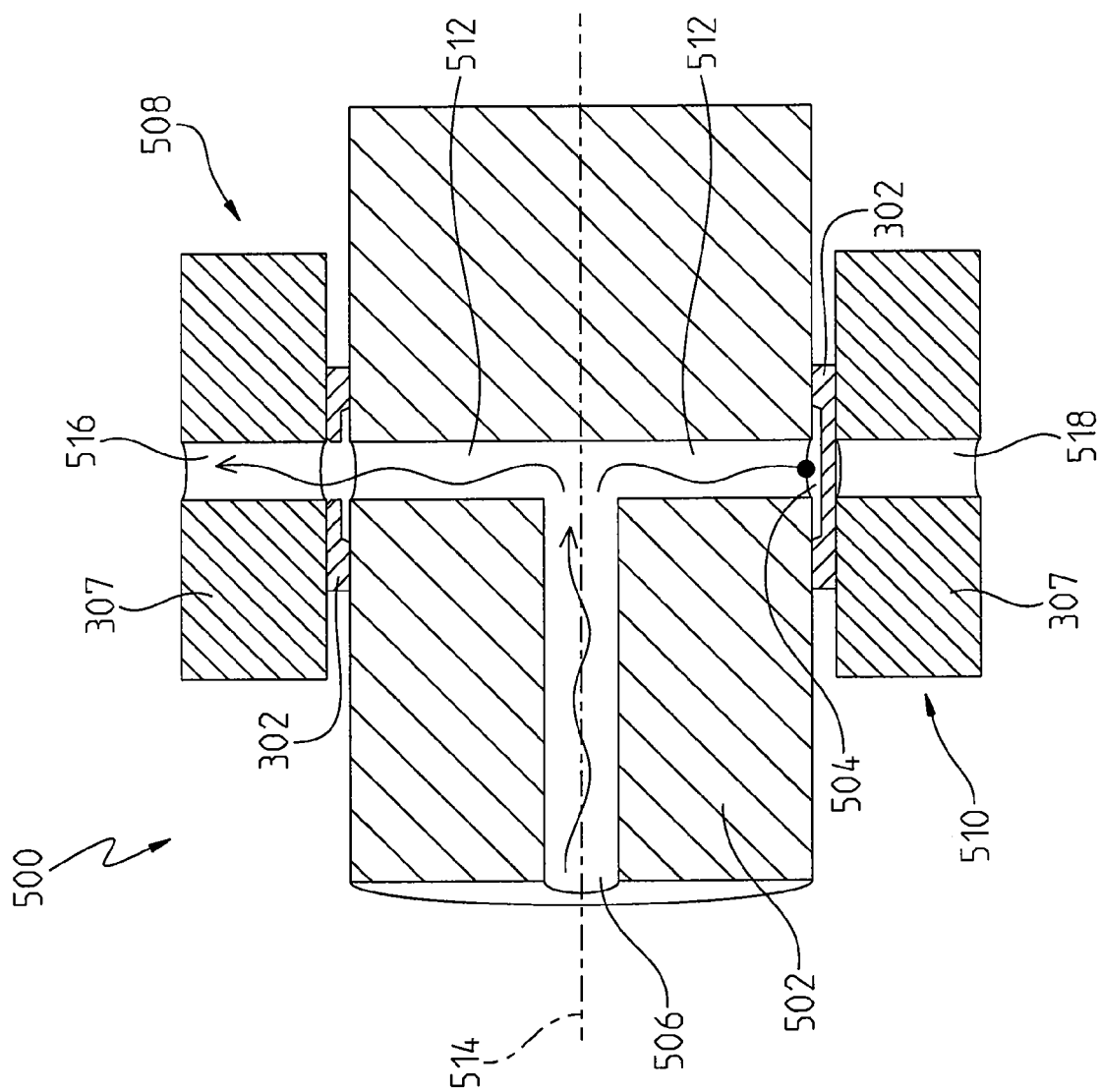
FIG. 5 is an axial section view of a carrier member with a bushing and a shaft disposed therein.

Referring to FIG. 2, one embodiment of a carrier member 204 and bushing assembly 200 is shown disposed within the transmission 118. Here, fluid from the electro-hydraulic system 138 can provide adequate fluid flow to maintain the internal lube circuit. Specifically, the assembly 200 can include a bushing 202 that allows fluid to transfer between the carrier member 204 and a kinetic member or shaft 502 (FIG. 5). The bushing 202 can be a substantially cylindrical member, often made of steel or other similar material. The bushing 202 may further have an outer diameter sufficient to allow the bushing 202 to be disposed within the carrier member 204 (e.g., press-fit). The inner diameter of the bushing 202 may be dimensioned to allow a kinetic member or shaft 502 to be disposed within the bushing and rotate or slide therein. Further, the bushing 202 surface adjacent to the kinetic member or shaft 502 may have an internal annulus groove or depression 206 that creates a channel between the kinetic member or shaft 502 surface, an annulus wall A 207, and an annulus wall B 208. The annulus groove 206 allows for the transfer of fluid between the kinetic member or shaft 502 and the carrier member 204. The location of the annulus groove 206 on the bushing 202 should not be seen as limiting. While this particular embodiment utilizes an annulus groove 206 on the internal surface of the bushing, one skilled in the art could understand how the annulus groove 206 could be located in the exterior surface of the bushing 202 as well.

In one aspect of the present disclosure, the inner surface of the annulus wall A 207 and the inner surface of the annulus wall B 208 may have a coating or material incorporated to reduce the amount of friction between the kinetic member or shaft 502 and the surfaces of annulus wall A 207 and annulus wall B 208. The coating or surface could also substantially restrict fluid from transferring (e.g., flowing or leaking) out of the annulus groove 206 along the surface of the shaft 502. The coating or material may be DuPont Teflon®, brass, nylon, or any other material or coating known to the skilled artisan for reducing friction between adjacent surfaces.

Further, the bushing assembly 200 shows one embodiment of a bushing containing a plurality of openings 205. The openings 205 can be located within the annulus groove 206 between annulus wall A 207 and annulus wall B 208. The shape, size, location, and number of openings 205 in the bushing 202 are determined by the specific location of carrier member fluid passageways 201. The shape, size, location, and number of the carrier member fluid passageways 201 can vary based on the application. While the specific shape, size, location, and number of the bushing openings 205 and the carrier member fluid passageways 201 may differ, they can correspond with each other to ensure the appropriate fluid transfer for an application without requiring indexing of the bushing 202 or creating an annulus groove in the carrier member. The specific spacing of bushing openings 205 and the carrier member fluid passageways 201 allows fluid to transfer from the kinetic member or shaft 502, into the internal annulus groove 206 of the bushing 202, through one of the bushing openings 205, and into the carrier member fluid passageway(s) 201.

The bushing assembly 200 also illustrates how the length of an opening 211 in the bushing 202 may be approximately 3 times an opening's width 213. The material between an opening 215 may be between 1 and 1.5 times the width of the opening 213. These ratios are only provided as non-limiting examples and are not intended to limit the present disclosure to these specific ratios. One skilled in the art can understand the specific size of the openings in the bushing is not of consequence as long as it is sufficiently big enough to allow adequate fluid transfer. Further, the material between the openings need only be sufficiently thick enough to provide adequate structural integrity to the bushing to allow it to be pressed into the carrier member.

As described above, the radially outer surface of the bushing 202 may be substantially press-fit into the carrier member 204. In this embodiment, the channel fluidly couples each of the plurality of bushing openings 205 along the radially inner surface (i.e., allows fluid to travel through the channel in the interior surface between the openings 205). However, the plurality of openings 205 is fluidly isolated from one another along the radially outer surface. That is to say, in this embodiment, the bushing 202 is configured to not transfer fluid along the radially outer surface of the bushing 202 between the openings 205 when the bushing 202 is press-fit into the carrier member 204.

Figure 3:
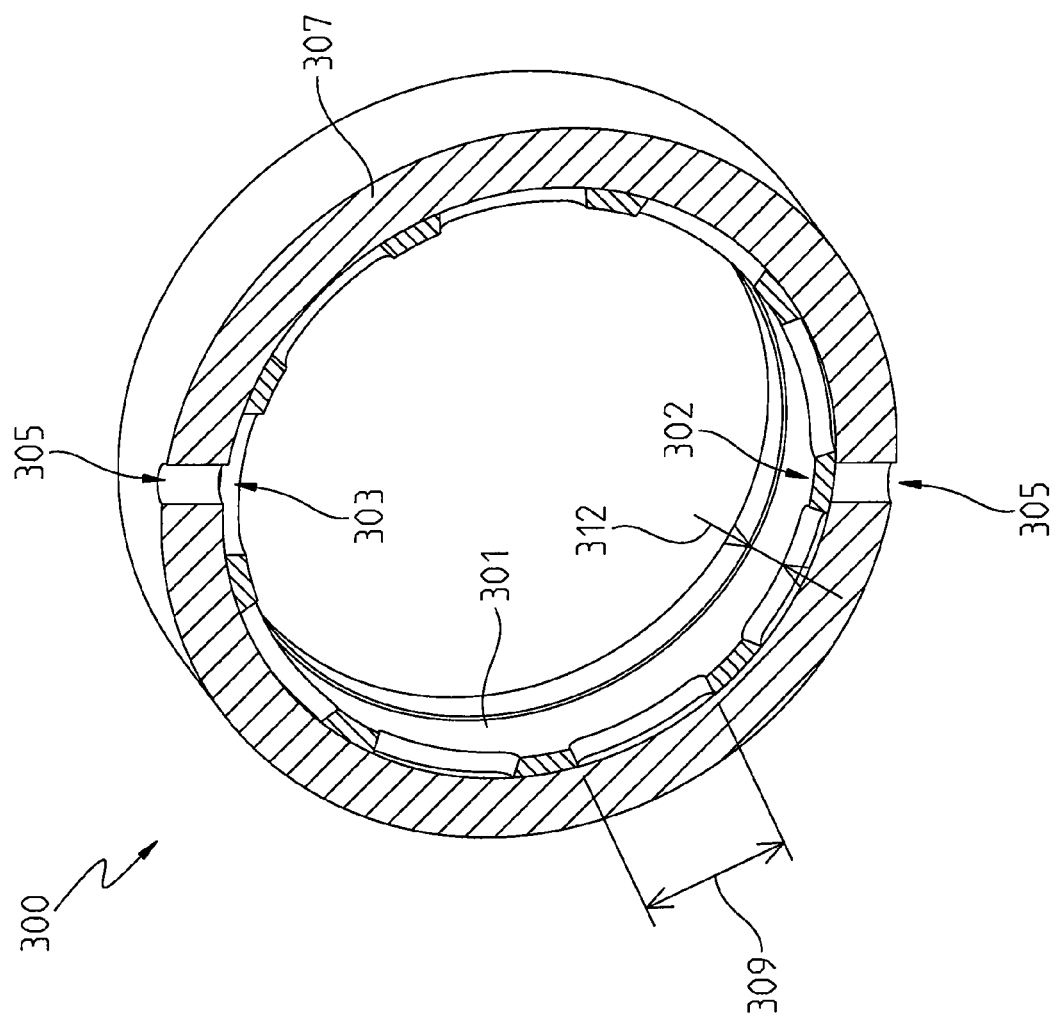
FIG. 3 is a partial section view of a carrier member with a bushing disposed therein.
Figure 4:
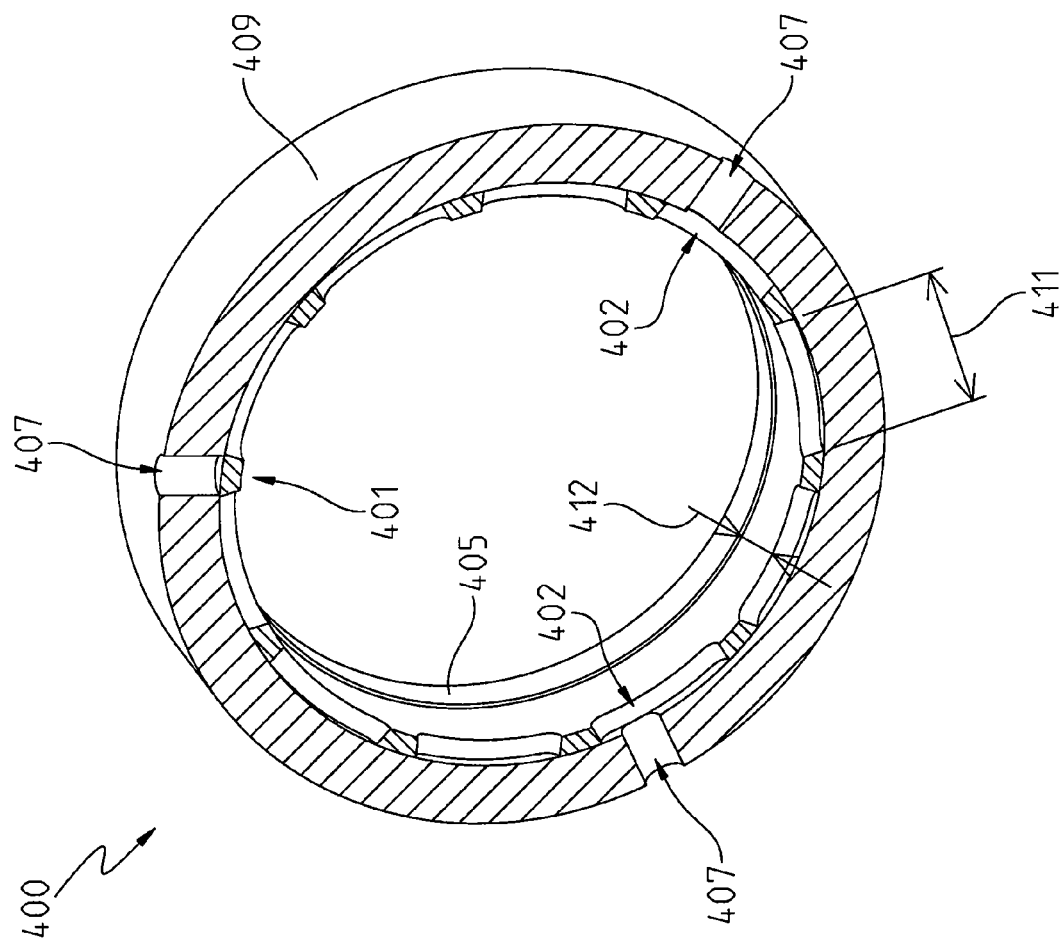
FIG. 4 is another partial section view of a carrier member with a bushing disposed therein.

Similarly, while the embodiments shown in FIG. 3 and FIG. 4 include nine and ten openings in the bushing respectively, the number of openings should not be limited. One skilled in the art can appreciate how a plurality of openings could be used. While this embodiment utilizes openings that are equidistant and proportionally sized, one skilled in the art can also understand how a plurality of locations and sizes of the openings in the bushing could be similarly used.

In FIG. 3, a perspective and sectional view of another bushing assembly 300 provides a bushing 301 fluidly coupled to at least one fluid passageway 303 defined in a carrier member 307. As shown, the bushing 301 is disposed in the carrier member 307 such that the bushing 301 has a plurality of openings 309 and the carrier member 307 has at least two fluid passageways 305. In this embodiment, the fluid passageways 305 are radially spaced opposite from one another. Similar to FIG. 2, the bushing openings 309 can be defined within an internal annulus groove 312 of the bushing 301. Here, the odd number of openings 309 in the bushing 301 can be spaced from one another to allow at least one of the carrier member fluid passageways 305 to be at least partially fluidly coupled to at least one of the bushing openings 309. For example, when one of the carrier member fluid passageways 309 is blocked by bushing material 302, the oppositely disposed carrier member fluid passageway 305 is at least partially fluidly coupled 303 to an opening 309 of the bushing 301.

In another embodiment shown in FIG. 4, the assembly 400 may require at least two fluid passageways 407 in a carrier member 409 be fluidly coupled to openings 411 in a bushing 405. Similar to the embodiment illustrated in FIG. 2, in this embodiment the carrier member 409 may include three fluid passageways 407 radially located around the bushing 405 in the carrier member 409. A plurality of openings 411 in the bushing 405 can be spaced radially equidistant from each other within an internal annulus groove 412 of the bushing 405. The bushing openings 411 correspond with the location of the carrier member fluid passageways 407 to ensure at least partial fluid coupling between two of the carrier member fluid passageways 407 without needing indexing between the carrier member 409 and the bushing 405 during installation. For example, if one carrier member fluid passageway 407 is blocked by a portion of the bushing 401, the other two carrier member fluid passageways 407 can be fluidly coupled to at least two bushing openings 402.

FIG. 5 illustrates a sectional view 500 along an axis of rotation 514 of the shaft 502 located in the slotted bushing 302 and carrier member 307. Specifically, a first section 508 illustrates how fluid coupling between the shaft 502 and carrier member 307 can be achieved. First, fluid can be introduced into a central bore 506 of the shaft 502. The central bore 506 can start at one end of the shaft and terminate as the central bore 506 approaches an area within the planar orientation of an annulus groove 504. The fluid can be pressurized by a pump, gravity, or any other means known in the art. As pressure is applied to the fluid, the fluid will travel through the central bore 506 and into a distribution channel 512.

The distribution channel 512 can be a through hole in the shaft 502 that is substantially perpendicular to the shaft's axis of rotation 514 and can be fluidly coupled to the central bore 506. Further, the distribution channel 512 can be located along the shaft 502 in an area that aligns the distribution channel 512 in the annulus groove 504 of the bushing 302. When pressurized fluid is introduced into the central bore 506, the fluid may travel through the central bore 506 along the axis of rotation 514 until the fluid reaches the distribution channel 512. After reaching the distribution channel 512, the fluid can flow radially away from the central bore 506 and into the annulus groove 504 created by the bushing 302. Once pressurized fluid reaches the annulus groove 504, it may be blocked from entering a second carrier member fluid passageway 518 at a second section 510, but it may be fluidly coupled to the carrier member 307 at a first carrier member fluid passageway 516 in the first section 508.

While the described embodiment utilizes only one through hole for the distribution channel 512, one skilled in the art could understand how a plurality of through holes or partial through holes could be used. For instance, instead of using one through hole for defining the distribution channel 512, three partial through holes could be radially aligned equidistant from, and coplanar to, one another. The three partial through holes could enter the shaft 502 a sufficient distance to allow fluid coupling to the central bore 506. Alternatively, two through holes that are substantially perpendicular to one another could be utilized instead of just one. One skilled in the art could understand how equally spacing the distribution channel within the shaft is beneficial because it allows for a balanced rotation of the shaft 502 but the current disclosure should not be limited to such applications.

Further, the size and quantity of both the central bore 506 and the distribution channel 512 can be varied to accommodate a plurality of flow rates. One skilled in the art could understand that a larger central bore, along with a larger or additional distribution channel, would allow for a higher flow rate of fluid to the bushing 302. These variations should be considered incorporated herein and the current disclosure should not be limited to any particular size, or number, of fluid passageways within the shaft 502.

An equidistant angular orientation of the carrier member fluid passageways 407 may be ideal for any number of carrier member fluid passageways as well. The equidistant angular orientation of the carrier member fluid passageways 407 allows for the balanced rotation of the carrier member 409. However, one skilled in the art can understand that many orientations are available for the carrier member fluid passageways 407 and therefore this particular embodiment should not be seen as limiting.

While the above embodiments illustrate a bushing 202 disposed within a carrier member 204, the disposition of the bushing 202 should not be limited. A person having ordinary skill in the art could appreciate how some aspects of the illustrated embodiments could be reversed. The above principles can be equally applied to a bushing that is fixedly disposed around a kinetic member or shaft. The kinetic member or shaft would then require the through hole characteristics above described for a carrier member and the bushing annulus groove could be located on the external surface of the bushing. The bushing would then move as the kinetic member or shaft moves. Fluid could be transferred from the kinetic member or shaft to the carrier member through the channel created by the bushing's external annulus groove and the interior wall of the carrier member.

Further, the above disclosure should be considered to encompass an embodiment where there are two or more sets of openings in the bushing. The openings may be on slightly offset parallel planes within the annulus groove of the bushing. The carrier member may contain a plurality of fluid passageways adjacent to one another. The opposing planar bushing openings may be slightly offset from one another ensuring that if one of the carrier member fluid passageways is covered, the other is fluidly coupled to the bushing opening. One skilled in the art can understand the many methods that can be used following the above principles to achieve fluid transfer through a bushing between a carrier member and a kinetic member or shaft.

The above embodiments should not be seen as limiting the configuration of the carrier member fluid passageways or openings in the bushing. The particular shape of the bushing openings, the distance of the bushing openings from each other, the location of the bushing openings in the annulus groove, and the location of the carrier member fluid passageways can be modified for a variety of configurations. Further, this disclosure is meant to encompass any configuration of openings in a bushing and carrier member that allow fluid to flow through the bushing without indexing the bushing or requiring a groove annulus in the carrier member.

Further disclosed is a method of manufacturing and assembling components that require fluid transfer through a bushing. The method includes manufacturing the necessary fluid passageways in a carrier member, the corresponding openings in a bushing, an annulus groove in the bushing, and a fluid passage orifice in the kinetic member or shaft.

The bushing can be manufactured by first cutting a strip of material that has an adequate width, thickness, and material composition for the specific bushing application to a length that corresponds with the circumference of the kinetic member. The strip of material may then have a groove machined out of the center of the width and extending the length of the strip of material. The groove may remove only enough material to create a channel along the groove and not be deep enough to negatively affect the structural integrity of the strip of material. Further, the groove may have a width that is less than the width of the strip of material. Next, a series of through holes or slots can be drilled into or punched out of the strip of material from a location within the groove. Finally, the strip of material can be bent into a substantially circular bushing that has an inner diameter that defines a circumference for the kinetic member and an outer diameter that allows the bushing to be defined within a carrier member.

The kinetic member or shaft can have a central bore drilled through one end until it reaches fluid alignment with a through hole. The through hole may be drilled through the kinetic member or shaft at a substantially perpendicular orientation to the central bore and be fluidly coupled to the central bore. The central bore and the through hole in the shaft can create the fluid passage orifice of the kinetic member or shaft. In other embodiments, the relationship between the through hole and the central bore may be other than perpendicular (e.g., angular), but the two structural features are fluidly coupled to one another.

The carrier member may also have at least one fluid passageway drilled, punched, or otherwise cut about the bushing coupling surface. The passageways can be located to at least partially align with the through holes or slots of the bushing when the bushing is pressed into the carrier member.

The method further allows disposing the bushing between the carrier member and the kinetic member or shaft at a location aligning the carrier member fluid passageways with the corresponding bushing openings. Finally the fluid passage orifice of the kinetic member or shaft should be aligned with the annulus groove of the bushing. Once the bushing is pressed into the carrier member, and the kinetic member is inserted through the bushing, the carrier member can be fluidly coupled to the kinetic member.

While embodiments incorporating the principles of the present disclosure have been discussed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

I claim:

1. A bushing for promoting fluid transfer between a first body and a second body, comprising:
    a single piece cylindrical sleeve including an inner surface and an outer surface;
    a groove formed in the inner surface, the groove defined by a first wall and a second wall; and
    a plurality of openings defined in the groove;
    wherein, each of the plurality of openings are radially spaced from one another;
    further wherein, the plurality of openings are fluidly isolated from one another along the outer surface when the bushing is disposed between the first body and the second body;
    further wherein at least one of the plurality of openings is aligned with the first body to enable a fluid to transfer between the first body and the second body regardless of the radial disposition of the cylindrical sleeve with respect to the first body when the bushing is disposed between the first body and the second body.

2. The bushing of claim 1, wherein the groove is defined annularly about the inner surface of the sleeve.

3. The bushing of claim 1, wherein the plurality of openings comprises an oval or rectangular shape.

4. The bushing of claim 1, wherein the inner surface comprises a friction-reducing coating or layer of material.

5. The bushing of claim 1, wherein the plurality of openings are equally spaced from one another and at least one of the plurality of openings is configured to at least partially overlap at least one fluid passageway in the first body independent of the radial disposition of the bushing.

6. The bushing of claim 1, wherein the first wall and the second wall are structured to substantially maintain a fluid within the groove.

7. A transmission for a motor vehicle, comprising:
    a shaft including a fluid directing channel defined therein;
    a carrier member including at least one fluid passageway for promoting fluid flow, wherein the fluid passageways of the carrier member is located along a bushing coupling surface; and
    a bushing disposed at least partially between the shaft and the carrier member, the bushing comprising:
        a single piece cylindrical body having an inner face, an outer face, a first edge, and a second edge;
        a depression formed in the inner face of the bushing between the first edge and the second edge; and
        a plurality of through holes defined in the depression and spaced radially from one another, the plurality of through holes defining a fluid path between the inner face and the outer face of the cylindrical body;
        wherein, the plurality of through holes are fluidly isolated from one another along the outer face when the bushing is disposed at least partially between the shaft and the carrier member;
    further wherein, the plurality of through holes are disposable at any radial location relative to the shaft and carrier member for fluidly coupling the fluid directing channel of the shaft, the depression, at least one of the plurality of through holes, and the fluid passageway of the carrier member.

8. The transmission of claim 7, wherein the depression is substantially centered between the first edge and the second edge.

9. The transmission of claim 7, wherein:
    the plurality of through holes comprises an oval or rectangular shape; and
    the depression is annularly shaped.

10. The transmission of claim 7, further comprising a first wall and a second wall that define a width of the depression;
    wherein, the first wall and the second wall substantially maintain a fluid in the depression along the inner face of the bushing.

11. The transmission of claim 7, wherein only one of the plurality of through holes is fluidly coupled to the fluid directing channel and the fluid passageway.

12. The transmission of claim 7, wherein the plurality of through holes are substantially centered between the first edge and the second edge.

13. The transmission of claim 7, wherein each through hole comprises a length and a width, where the length is at least three times the width.

14. The transmission of claim 7, wherein at least one of the plurality of through holes defined in the depression does not overlap any portion of the at least one fluid passageway.

15. The transmission of claim 7, wherein the plurality of through holes are equally spaced from one another in the depression.

16. A method for manufacturing and installing a bushing that allows for fluid transfer between a carrier member with a fluid transfer passage and a kinetic member with fluid transfer passage, the method comprising:
    cutting a piece of material having a flat exterior portion at the time of cutting to a desired length;
    forming an annulus groove along an interior portion of the length of the piece of material;
    forming a plurality of through holes in the annulus groove;
    bending the material to create a single piece substantially cylindrical bushing;
    pressing the bushing into the carrier member without indexing the through holes relative to the carrier member, fluidly isolating the plurality of through holes along the flat exterior portion; and inserting the kinetic member therein.

17. The method of claim 16, further comprising forming the through holes to be equally spaced from one another.

18. The method of claim 16, further comprising forming a fluid passage in the kinetic member such that after the inserting step the fluid passage is fluidly coupled with at least one of the plurality of through holes.

19. The method of claim 16, further comprising fabricating an orifice in the carrier member such that after the pressing step the orifice at least partially overlaps at least one of the plurality of through holes.

20. The method of claim 16, wherein the step of bending the material positions the annulus groove on an interior surface of the bushing.

* * * * *